UNITED STATES PATENT OFFICE.

WILLIAM J. EISENBEISS, OF CHICAGO, ILLINOIS.

NON-ALCOHOLIC CARBONATED BEVERAGE.

1,262,472.  Specification of Letters Patent.  Patented Apr. 9, 1918.

No Drawing.  Application filed November 4, 1916. Serial No. 129,536.

*To all whom it may concern:*

Be it known that I, WILLIAM J. EISENBEISS, a citizen of the United States, residing at Chicago, in the county of Cook and State of Illinois, have invented new and useful Improvements in Non-Alcoholic Carbonated Beverages, of which the following is a specification.

This invention has for its object to produce a beverage resembling beer in appearance and taste, but entirely free from alcohol, and unfermented.

The invention also has for its object to provide a beverage of the kind stated which is composed of cheap and readily obtainable ingredients, and which is produced by a simple and inexpensive process.

In carrying out the invention, the following materials are used to produce one barrel (31 gallons) of the beverage:

Bran, 4 to 6 pounds,
Hops, ¼ to ¾ pounds,
Sugar, 10 to 20 pounds,
Salt, 4 to 6 ounces,
Vinegar, 1 pint,
Coloring matter, 5 ounces.

The sugar may be brewer's extract, glucose, or any other saccharine material, and the salt may be ordinary sodium chlorid or burtonizing salts, the latter being a mixture of common salt and soluble gypsum used in the brewing art.

The bran and salt (or burtonizing salts) are steeped in 15½ gallons (or ½ barrel) of water at a temperature of 121 degrees Fahrenheit for a period of from one half to one hour. By soaking the bran in the saline liquid heated below the boiling point, and for the period stated, the albumin in the bran is extracted, which gives the beverage a good head of foam. After steeping the materials stated for the time and at the temperature specified, the liquid is run into a kettle, and water at a temperature of 121 degrees Fahrenheit is added to obtain the desired quantity of one barrel (31 gallons), after which the sugar is added to the liquid, and the same is boiled for one hour. One half of the stated amount of hops is then added, and the liquid is boiled for another period of one hour, after which the remainder of the stated amount of hops is added to the boiling liquid, and the same is boiled for another period of forty minutes. At the expiration of the last-mentioned boiling period, the coloring matter is added, which gives the liquid an amber color. The coloring matter may be ordinary caramel coloring. The liquid is next run into a tank and cooled down to from 41 to 43 degrees Fahrenheit and allowed to rest for a period of from 15 to 30 hours, three grains of isinglass being added to clear or fine it. The liquid is next acidulated by adding vinegar, and it is also slightly carbonated. The liquid is then allowed to age for a period of from one to four weeks, after which it is filtered and well carbonated and run into proper containers, it being now ready for use. The amount of sugar used will depend on the specific gravity the beverage is to have, say from 1.0233 to 1.0240. The vinegar is employed for the purpose of imparting a slightly acid flavor to the beverage.

It is necessary that when the bran is soaked in the saline liquid, such liquid be heated below the boiling point, the liquid being heated to a temperature of about 121° F. At this temperature the saline solution will set free the enzym peptase which is the agent by which the insoluble albuminoids in the bran are modified into soluble albuminoids. Without the generation of peptase the albuminoids will be insoluble. It is the purpose to obtain albumin in a soluble form, and as peptase is the agent which renders insoluble albuminoids soluble, it is important that the saline liquid be heated to the temperature stated. Peptase is most active at temperatures between 100° and 120° F.; while diastase, which converts starch contained in grain into maltose, malto-dextrin, and dextrin, is most abundant from 140° to 154° F., and very weak above 170° F. Hence, the temperature at which the material is held will determine very different products at different temperatures. Thus, at or below 100° F. an insoluble albuminoid precipitate is obtained; from 100° to 120° F. there is obtained the best condition for generation of peptase to produce soluble albuminoids, incapable of fermentation, and hence, non-alcoholic; while from 140° to 154° F. there is obtained, through the abundance of diastase, a fermentable product, and hence, alcoholic. The importance of soaking the bran in the saline liquid heated at or about a temperature of 121° F., will therefore be apparent. At this temperature the albumin is not precipitated, but remains always in solution even when the liquid is afterward boiled. Through the action of peptase the albumin is rendered soluble to such an extent that it cannot be noticed with the naked eye and at no time will the albumin coagulate, nor is the solubility of the albumin affected by the subsequent steps of the process. After the product is carbonated and ready for use, a heavy head of foam forms when it is drawn, and the beverage has every appearance of ordinary beer.

I claim:—

1. The process of making a non-alcoholic beverage consisting in steeping bran in a saline liquid to extract the albumin from the bran, then adding water and a sweetening agent, and boiling the whole, then adding hops and again boiling the whole, and finally cooling, acidulating and carbonating the product.

2. The process of making a non-alcoholic beverage consisting in steeping bran in a saline liquid to extract the albumin from the bran, then adding water and a sweetening agent, and boiling the whole, then adding hops and again boiling the whole, then again adding hops and boiling the whole, then cooling the liquid and adding vinegar thereto and slightly carbonating the product, and finally filtering and carbonating the product.

3. The process of making a non-alcoholic beverage consisting in steeping bran in a saline liquid to extract the albumin from the bran, then adding water and a sweetening agent, and boiling the whole, then adding hops and again boiling the whole, then again adding hops and boiling the whole, then adding a coloring matter, then cooling the liquid and adding vinegar thereto, and slightly carbonating the product, and finally filtering and carbonating the product.

4. A non-alcoholic beverage consisting of an albuminous liquid obtained from steeping bran in a saline solution, hops, a sweetening agent and an acid.

5. A non-alcoholic beverage consisting of an albuminous liquid obtained from steeping bran in a saline liquid, hops, a sweetening agent, and vinegar.

6. A process for extracting albumin in a soluble form from a vegetable substance, consisting in steeping such substance in a saline liquid heated to a temperature ranging from 100° to 121° F. to set free peptase for modifying the insoluble albuminoids into soluble albuminoids.

In testimony whereof I affix my signature.

WILLIAM J. EISENBEISS.